United States Patent
Seibert et al.

(10) Patent No.: US 10,630,810 B2
(45) Date of Patent: Apr. 21, 2020

(54) COMMUNICATIONS BETWEEN HEAD-MOUNTED DEVICES (HMDS) IN VIRTUAL, AUGMENTED, AND MIXED REALITY (XR) APPLICATIONS

(71) Applicant: Dell Products, L.P., Round Rock, TX (US)

(72) Inventors: Philip M. Seibert, Austin, TX (US); Anantha K. Boyapalle, Cedar Park, TX (US); Karthikeyan Krishnakumar, Austin, TX (US); Vivek Viswanathan Iyer, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 125 days.

(21) Appl. No.: 16/008,888

(22) Filed: Jun. 14, 2018

(65) Prior Publication Data
US 2019/0387074 A1    Dec. 19, 2019

(51) Int. Cl.
| | |
|---|---|
| *G06F 15/16* | (2006.01) |
| *H04L 29/06* | (2006.01) |
| *G06F 1/3234* | (2019.01) |
| *G02B 27/01* | (2006.01) |
| *H04W 80/02* | (2009.01) |
| *H04W 76/20* | (2018.01) |
| *H04W 88/02* | (2009.01) |

(52) U.S. Cl.
CPC ............ *H04L 67/38* (2013.01); *G02B 27/017* (2013.01); *G06F 1/3278* (2013.01); *H04W 76/20* (2018.02); *H04W 80/02* (2013.01); *H04W 88/02* (2013.01)

(58) Field of Classification Search
CPC .............................. H04W 80/02; H04W 76/20
See application file for complete search history.

(56) References Cited

U.S. PATENT DOCUMENTS

| | | | | |
|---|---|---|---|---|
| 9,826,524 | B2* | 11/2017 | Medapalli | H04W 72/044 |
| 9,860,050 | B1* | 1/2018 | Noolu | H04L 5/14 |
| 10,044,490 | B2* | 8/2018 | Navalekar | H04L 5/14 |
| 2003/0064718 | A1* | 4/2003 | Haines | H04W 48/16 |
| | | | | 455/423 |
| 2003/0231655 | A1* | 12/2003 | Kelton | H04N 7/17318 |
| | | | | 370/468 |
| 2007/0197256 | A1* | 8/2007 | Lu | H04B 1/406 |
| | | | | 455/552.1 |
| 2008/0090533 | A1* | 4/2008 | Rofougaran | H04B 1/40 |
| | | | | 455/161.1 |
| 2009/0170436 | A1* | 7/2009 | Olofsson | H04B 1/385 |
| | | | | 455/41.3 |

(Continued)

*Primary Examiner* — Hieu T Hoang
(74) *Attorney, Agent, or Firm* — Fogarty LLP

(57) ABSTRACT

Systems and methods for communications between Head-Mounted Devices (HMDs) in virtual, augmented, and mixed reality (xR) applications are described. In an illustrative, non-limiting embodiment, a first HMD may include a processor and a memory coupled to the processor, the memory having program instructions stored thereon that, upon execution, cause the first HMD to: during execution of an xR application, maintain a receive (Rx) channel with a second HMD, as part of a communication session, using a first transport; and maintain a transmit (Tx) channel with the second HMD, concurrently with the Rx channel and as part of the communication session, using a second transport different from the first transport.

19 Claims, 4 Drawing Sheets

(56) References Cited

U.S. PATENT DOCUMENTS

| | | | |
|---|---|---|---|
| 2009/0239468 A1* | 9/2009 | He | H04L 63/0853 |
| | | | 455/41.2 |
| 2011/0300805 A1* | 12/2011 | Gaikwad | H04W 52/243 |
| | | | 455/63.1 |
| 2012/0046000 A1* | 2/2012 | Gao | H04W 72/02 |
| | | | 455/73 |
| 2014/0006787 A1* | 1/2014 | Measson | H04W 12/04 |
| | | | 713/171 |
| 2016/0366638 A1* | 12/2016 | Kumar | H04W 52/0206 |
| 2017/0124853 A1* | 5/2017 | Mehta | H04M 1/72536 |
| 2017/0168966 A1* | 6/2017 | Mishra | H04W 4/80 |
| 2018/0331724 A1* | 11/2018 | Li | H04R 1/1091 |

\* cited by examiner

COMMUNICATIONS BETWEEN HEAD-MOUNTED DEVICES (HMDS) IN VIRTUAL, AUGMENTED, AND MIXED REALITY (XR) APPLICATIONS

FIELD

The present disclosure generally relates to Information Handling Systems (IHSs), and, more particularly, to systems and methods for communications between Head-Mounted Devices (HMDs) in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In modern applications, IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible.

In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In modern implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for communications between Head-Mounted Devices (HMDs) in virtual, augmented, and mixed reality (xR) applications are described. In an illustrative, non-limiting embodiment, a first HMD may include a processor and a memory coupled to the processor, the memory having program instructions stored thereon that, upon execution, cause the first HMD to: during execution of an xR application, maintain a receive (Rx) channel with a second HMD, as part of a communication session, using a first transport; and maintain a transmit (Tx) channel with the second HMD, concurrently with the Rx channel and as part of the communication session, using a second transport different from the first transport.

In some implementations, the first and second transports may be selected from the group consisting of: infrared, radio frequency, or ultrasonic. The program instructions, upon execution, may cause the first HMD to determine a latency of each of a plurality of transports. The program instructions may also cause the first HMD to: request that the second HMD transmit a first message to the first HMD using the first transport, where the first transport has the lowest latency among the plurality of transports, and measure a first signal-to-noise ratio (SNR) of the first message; request that the second HMD transmit a second message to the first HMD using the second transport, where the second transport has the second lowest latency among the plurality of transports, and measure a second SNR of the second message; and select the first transport to maintain the Rx channel in response to a determination that the first SNR is greater than the second SNR.

The program instructions, upon execution, may also cause the first HMD to determine a throughput of each of a plurality of transports. The program instructions may cause the first HMD to: request that the second HMD transmit a first message to the first HMD using the first transport, where the first transport has a highest throughput among the plurality of transports, and measure a first SNR of the first message; request that the second HMD transmit a second message to the first HMD using the second transport, where the second transport has a second highest throughput among the plurality of transports, and measure a second SNR of the second message; and select the first transport to maintain the Rx channel in response to a determination that the first SNR is greater than the second SNR.

Additionally, or alternatively, the program instructions, upon execution, may cause the first HMD to: transmit a first message to the second HMD using the first transport; transmit a second message to the second HMD using the second transport; and receive a selection of the second transport from the second HMD to maintain the Tx channel, at least in part, in response to a determination by the second HMD that the second SNR is greater than the first SNR.

Additionally, or alternatively, the program instructions, upon execution, may cause the first HMD to, in response to a battery power available to the first HMD falling below a threshold value, determine that the first transport has a lower receive power consumption than the second transport; and select the first transport in response to the determination. Additionally, or alternatively, the program instructions, upon execution, may cause the first HMD to, in response to a battery power available to the second HMD falling below a threshold value, determine that the first transport has a lower transmit power consumption than the second transport; and select the first transport in response to the determination.

In response to a degradation of the Rx channel during execution of the xR application, the program instructions, upon execution, may cause the first HMD to establish another Rx channel with the second HMD using the second transport. The program instructions, upon execution, may further cause the first HMD to: during execution of the xR application, maintain communications with a third HMD via the second HMD.

In another illustrative, non-limiting embodiment, a method includes operating, by a first HMD, an Rx channel with a second HMD, where the Rx channel uses a first transport; and operating, by the first HMD, a Tx channel with the second HMD, concurrently with the Rx channel and as part of a single communications session, where the Tx channel uses a second transport. The method may also include determining a latency and a throughput for the Rx channel and the Tx channel.

The method may include: requesting that the second HMD transmit a first communication to the first HMD using the first transport, measuring a first signal-to-noise ratio (SNR) of the first communication, requesting that the second HMD transmit a second communication to the first HMD using the second transport, measuring a second SNR of the second communication, and switching the Rx channel to the second transport, during the single communications session, in response to a determination that the second SNR is greater than the first SNR. Additionally, or alternatively, the method may include: transmitting a first communication to the second HMD using the first transport, transmitting a second communication to the second HMD using the second transport, and switching the Tx channel to the first transport, during the single communications session, in response to a determination by the second HMD that an SNR of the first communication is greater than an SNR of the second communication.

In some cases, the method may include, in response to a battery power available to the first HMD falling below a threshold value, switching the Rx channel to the second transport. Additionally, or alternatively, in response to a battery power available to the second HMD falling below a threshold value, the method may include switching the Tx channel to the first transport.

In yet another illustrative, non-limiting embodiment, a hardware memory device of a first HMD may have program instructions stored thereon that, upon execution by a hardware processor, cause the first HMD to: maintain an Rx channel with a second HMD, where the Rx channel uses a first transport; and maintain a Tx channel with the second HMD, concurrently with the Rx channel and as part of a single communications session, where the Tx channel uses a second transport.

The program instructions, upon execution by the hardware processor, may cause the first HMD to, in response to a power available to the first HMD falling below a threshold value, switch the Rx channel to the second transport. Additionally, or alternatively, the program instructions may cause the first HMD to, in response to a power available to the second HMD falling below a threshold value, switch the Tx channel to the first transport.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for communications between Head-Mounted Devices (HMDs) in virtual, augmented, and mixed reality ("xR") applications. These techniques are particularly useful in xR applications that employ HMDs, Heads-Up Displays (HUDs), and eyeglasses—collectively referred to as "HMDs."

Figure 1:
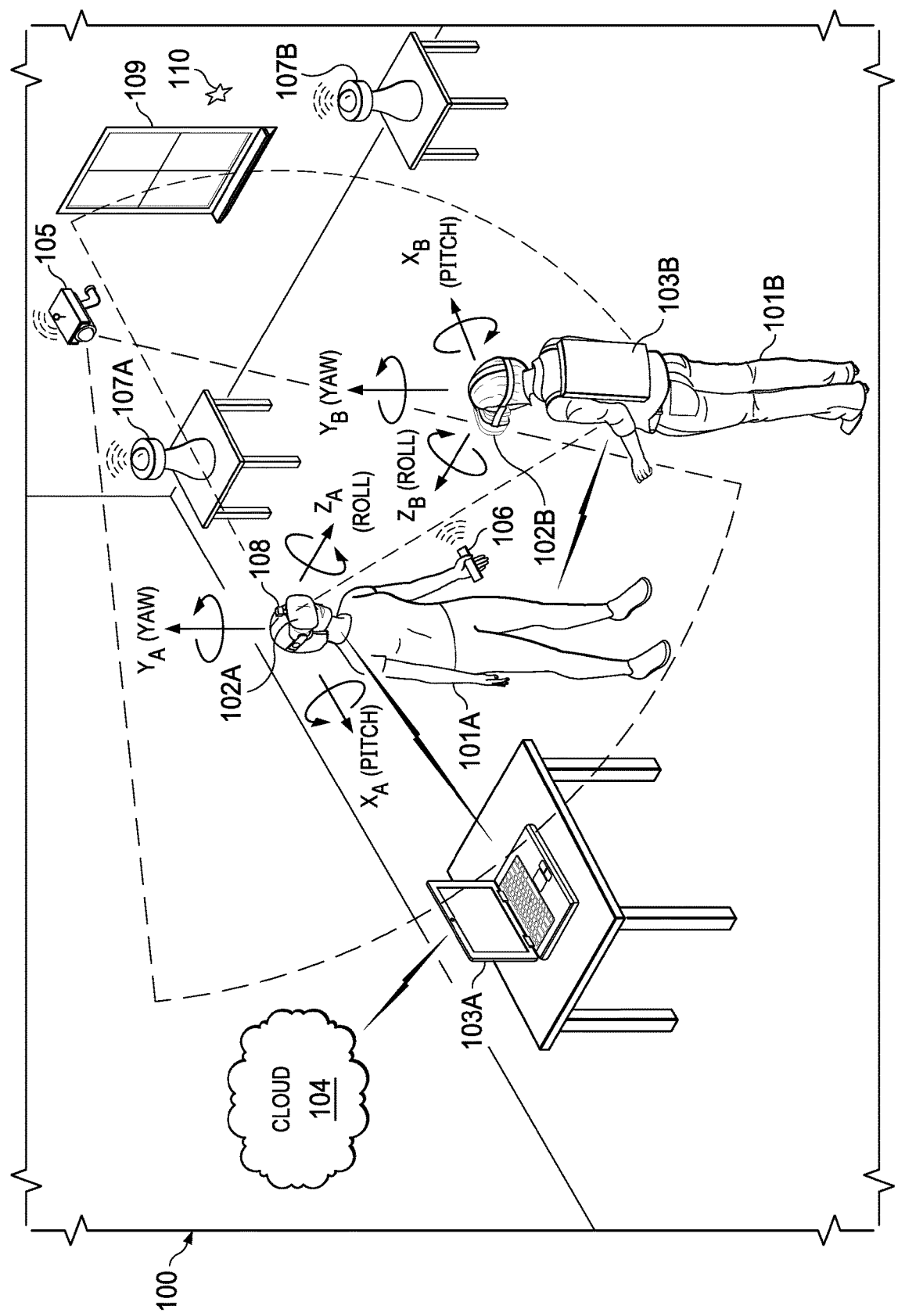
FIG. 1 is a perspective view of an example of an environment having co-located Head-Mounted Displays (HMDs), according to some embodiments.

FIG. 1 is a perspective view of an example of physical environment 100 having co-located HMDs 102A and 102B. As illustrated, user 101A wears HMD 102A around their head and over their eyes during execution of an xR application. Similarly, user 101B wears HMD 102B. In this non-limiting example, HMD 102A is tethered to host Information Handling System (IHS) 103A via a wireless connection, and HMD 102B is tethered to host IHS 103B via a wired connection.

In environment 100, the xR application being executed may include a subset of components or objects operated by HMD 102A and another subset of components or objects operated by host IHS 103A; as well as a subset of components or objects operated by HMD 102B and another subset of components or objects operated by host IHS 103B.

Particularly, host IHS 103A may be used to generate digital images to be displayed by HMD 102A. HMD 102A transmits information to host IHS 103A regarding the state of user 101A, such as physical position, pose or head orientation, gaze focus, etc., which in turn enables host IHS 103A to determine which image or frame to display to the user next, and from which perspective. Meanwhile, IHS 103B may generate digital images to be displayed by HMD 102B based on the state of user 101B in a corresponding manner. In this example, host IHS 103B is built into (or otherwise coupled to) a backpack or vest, wearable by user 101B.

As user 101A moves about environment 100, changes in: (i) physical location (e.g., Euclidian or Cartesian coordinates x, y, and z) or translation; and/or (ii) orientation (e.g., pitch, yaw, and roll) or rotation, cause host IHS 103A to effect a corresponding change in the picture or symbols displayed to user 101A via HMD 102A, usually in the form of one or more rendered video frames. Similarly, as user 101B moves, changes in HMD 102B's physical location or translation; and/or HMD 102B's orientation or rotation, cause host IHS 103B to effect corresponding changes in the video frames displayed to user 101B via HMD 102B.

Movement of the user's head and gaze may be detected by HMD 102A and processed by host IHS 103A, for example, to render video frames that maintain visual congruence with the outside world and/or to allow user 101A to look around a consistent virtual reality environment. In some cases, xR application components executed by HMDs 102A-B and IHSs 103A-B may provide a cooperative, at least partially shared, xR environment between users 101A and 101B, such as in the form of a video game or a productivity application (e.g., a virtual meeting).

As used herein, the term "Simultaneous Localization and Mapping" or "SLAM" refers systems and methods that use positional tracking devices to construct a map of an unknown environment where an HMD is located, and that simultaneously identifies where an HMD is located, its orientation, and/or pose.

Generally, SLAM methods implemented in connection with xR applications may include a propagation component, a feature extraction component, a mapping component, and an update component. The propagation component may receive angular velocity and accelerometer data from an Inertial Measurement Unit (IMU) built into the HMD, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as the HMD moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMDs 102A-B may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more tokens 106 or tags 110 that are tracked; such that HMDs 102A-B triangulate their respective positions and/or states using those elements. Inertial tracking may use data from accelerometers and gyroscopes within HMDs 102A-B to find a velocity and position of HMDs 102A-B relative to some initial point. Acoustic tracking may use ultrasonic sensors to determine the position of HMDs 102A-B by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102A, and infrared markers 107A-B or tag 110 may be placed in known stationary locations. With outside-in tracking, camera 105 may be placed in a stationary location and infrared markers 106 may be placed on HMDs 102A or held by user 101A. In others cases, markerless inside-out tracking may use continuous searches and feature extraction techniques from video frames obtained by camera 108 (e.g., using visual odometry) to find natural visual landmarks (e.g., window 109) in environment 100.

In various embodiments, data obtained from a positional tracking system and technique employed by HMDs 102A-B may be received by host IHSs 103A-B, which in turn execute the SLAM method of an xR application. In the case of an inside-out SLAM method, for example, an xR application receives the position and orientation information from HMDs 102A-B, determines the position of features extracted from the images captured by camera 108, and corrects the localization of landmarks in space using comparisons and predictions.

An estimator, such as an Extended Kalman filter (EKF) or the like, may be used for handling the propagation component of an inside-out SLAM method. In some cases, a map may be generated as a vector stacking sensors and landmarks states, modeled by a Gaussian variable. The map may be maintained using predictions (e.g., when HMDs 102A-B move) and corrections (e.g., camera 108 observes landmarks in the environment that have been previously mapped). In other cases, a map of environment 100 may be obtained, at least in part, from cloud 104.

Figure 2:
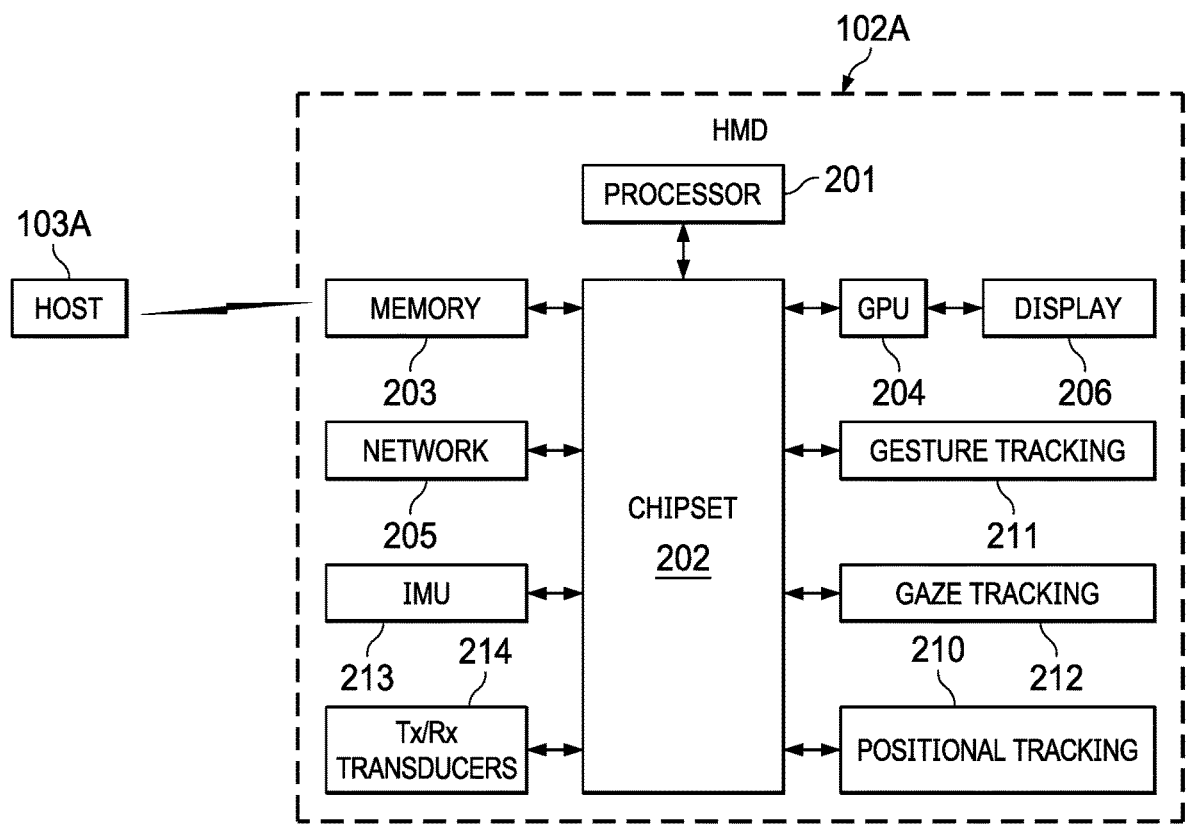
FIG. 2 is a diagram of an example of an HMD and a host Information Handling System (IHS), according to some embodiments.

FIG. 2 is a block diagram of an example HMD 102A and host IHS 103A comprising an xR system, according to some embodiments. As depicted, HMD 102A includes components configured to create and/or display an all-immersive virtual environment; and/or to overlay digitally-created content or images on a display, panel, or surface (e.g., an LCD panel, an OLED film, a projection surface, etc.) in place of and/or in addition to the user's natural perception of the real-world.

As shown, HMD 102A includes processor 201. In various embodiments, HMD 102A may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

HMD 102A includes chipset 202 coupled to processor 201. In certain embodiments, chipset 202 may utilize a QuickPath Interconnect (QPI) bus to communicate with processor 201. In various embodiments, chipset 202 provides processor 201 with access to a number of resources. For example, chipset 202 may be coupled to network interface 205 to enable communications via various wired and/or wireless networks.

Chipset 202 may also be coupled to display controller or graphics processor (GPU) 204 via a graphics bus, such as an Accelerated Graphics Port (AGP) or Peripheral Component Interconnect Express (PCIe) bus. As shown, graphics processor 204 provides video or display signals to display 206.

Chipset 202 further provides processor 201 and/or GPU 204 with access to memory 203. In various embodiments, memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or GPU 204, present an xR application to user 101A wearing HMD 102A.

Other resources coupled to processor 201 through chipset 202 may include, but are not limited to: positional tracking system 210, gesture tracking system 211, gaze tracking system 212, and inertial measurement unit (IMU) system 213.

Positional tracking system 210 may include one or more optical sensors (e.g., a camera 108) configured to determine how HMD 102A moves in relation to environment 100. For example, an inside-out tracking system 210 may be configured to implement markerless tracking techniques that use distinctive visual characteristics of the physical environment to identify specific images or shapes which are then usable to calculate HMD 102A's position and orientation.

Gesture tracking system 211 may include one or more cameras or optical sensors that enable user 101 to use their hands for interaction with objects rendered by HMD 102A.

For example, gesture tracking system 211 may be configured to implement hand tracking and gesture recognition in a 3D-space via a user-facing 2D camera. In some cases, gesture tracking system 211 may track a selectable number of degrees-of-freedom (DOF) of motion, with depth information, to recognize dynamic gestures (e.g., swipes, clicking, tapping, grab and release, etc.) usable to control or otherwise interact with xR applications executed by HMD 102A.

Gaze tracking system 212 may include an inward-facing projector configured to create a pattern of infrared or (near-infrared) light on the user's eyes, and an inward-facing camera configured to take high-frame-rate images of the eyes and their reflection patterns; which are then used to calculate the user's eye's position and gaze point. In some cases, gaze detection or tracking system 212 may be configured to identify a direction, extent, and/or speed of movement of the user's eyes in real-time, during execution of an xR application.

IMU system 213 may include one or more accelerometers and gyroscopes configured to measure and report a specific force and/or angular rate of the user's head. In some cases, IMU system 212 may be configured to a detect a direction, extent, and/or speed of rotation (e.g., an angular speed) of the user's head in real-time, during execution of an xR application.

Transmit (Tx) and receive (Rx) transducers and/or transceivers 214 may include any number of sensors and components configured to send and receive communications using different physical transport mechanisms. For example, Tx/Rx transceivers 214 may include electromagnetic (e.g., radio-frequency, infrared, etc.) and acoustic (e.g., ultrasonic) transport mechanisms configured to send and receive communications, to and from other HMDs, under control of processor 201. Across different instances of HMDs, components of Tx/Rx transceivers 214 may also vary in number and type of sensors used. These sensors may be mounted on the external portion of frame of HMD 102A, to facilitate direct communications with other HMDs.

In some implementations, HMD 102A may communicate with HMD 102B and/or host IHS 103A via wired or wireless connections (e.g., WiGig, WiFi, etc.). For example, if host IHS 103A has more processing power and/or better battery life than HMD 102A, host IHS 103A may be used to offload some of the processing involved in the creation of the xR experience.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

In various embodiments, HMD 102A and/or host IHS 103A may not include each of the components shown in FIG. 2. Additionally, or alternatively, HMD 102A and/or host IHS 103A may include components in addition to those shown in FIG. 2. Furthermore, components represented as discrete entities in FIG. 2 may, in some embodiments, be integrated with other components. In various implementations, all or a portion of the functionality provided by the illustrated components may be provided by components integrated as a System-On-Chip (SOC), or the like.

HMD-to-HMD Communications

The inventors hereof have recognized that HMDs are highly desirable in collaborative environments. For example, two or more users with HMDs may be co-located and viewing a common virtual 3D model or artifact. Each xR system, defined as an HMD and associated host IHS, whether physically in the same package or not (e.g., a first xR system comprises HMD 102A and host IHS 103A, and a second xR system comprises HMD 102B and IHS 104B), may be configured to identify other xR systems as intended collaborators, and to communicate with each other during a collaboration session.

Accordingly, systems and methods described herein may facilitate the negotiation, selection, establishment, and/or maintenance of bi-directional communications between HMDs 102A-B in which the transmit (Tx) transceiver of a transmitting HMD used is selected by a receiving HMD, on a case-by-case basis. Thus, Tx and Rx transceivers or sensors in a single connection or communication session may employ different transport technologies (e.g., ultrasonic Tx and IR Rx), and these transports may be dynamically chosen based on the environment and device capability; rather than a one-time design specification.

In some implementations, xR systems may also be configured to communicate via conventional network mechanisms (e.g., via Ethernet, WiFi, or WiFi Direct between IHSs 103A and 103B, for example). But, there are situations where low latency is a priority over high throughput. Therefore, for a more comprehensive solution, systems and methods described herein may provide from a point-to-point negotiation between HMDs themselves. These HMD-to-HMD negotiations may involve each HMD assessing their physical environments and determining their preferred mode of peer-to-peer (P2P) communication, for example, based on signal-to-noise ratios (SNRs) of various sensors, or the like.

Using systems and methods described herein, each HMD may dynamically select or prioritize their own different Rx modes of communication, using different physical transport mechanisms.

Consider a scenario where HMD 102A experiences an unreliable acoustic environment, and thus prefers to avoid ultrasonic reception in favor of infrared communications. However, HMD 102B is experiencing noisy IR surroundings, and currently prefers to receive ultrasonic communications. In this case, two conventional HMDs would disagree as to the best mode or transport of communications, and would not be able to negotiate optimal communications with each other—either way, both HMDs establish communications using a suboptimal method in at least one direction, for transmitting or receiving. (Also, when a conventional HMD does not have the type of transmitter for establishing a physical transport mechanism through which another conventional HMD would like to receive its messages, the other HMD may be forced to use a suboptimal transport.)

Using systems and methods described herein, however, hybrid or multi-mode P2P communications may be established between HMDs 102A and 102B directly. A preferred Rx mode may be independently determined by each HMD and communicated to other HMDs. Multi-mode bi-directional communications between HMDs 102A and 102B may be established using the preferred Rx mode for each recipient, resulting in different Tx and Rx transceivers used concurrently as a part of an HMD-HMD connection or a single communication session of requests and respective responses.

In some embodiments, HMD 102A may request to receive messages in a given Rx mode or transport from HMD 102B. A preferred Rx mode or transport mechanism may be re-evaluated at selected or periodic time intervals, and upgraded if a higher quality (e.g., more reliable, greater throughput, etc.) connection becomes available.

In some cases, HMD 102A may determine itself not capable, or not sufficiently capable, to transmit in a given mode or transport (e.g., mode not present, mode in an interference environment, mode not sustainable due to power requirements, etc.). In that case, HMDs 102A and 102B may negotiate Tx/Rx methods based on alternate criteria, such as combined SNR or power optimization criteria.

Moreover, in the case of three or more xR systems participating in the same collaboration session, HMDs A, B, and C may behave as follows: (1) HMD A communicates with HMD B via methods X and Y; (2) HMD B communicates with HMD C via methods M and N; and (3) HMDs A and C communicate with each other through HMD B.

Figure 3:
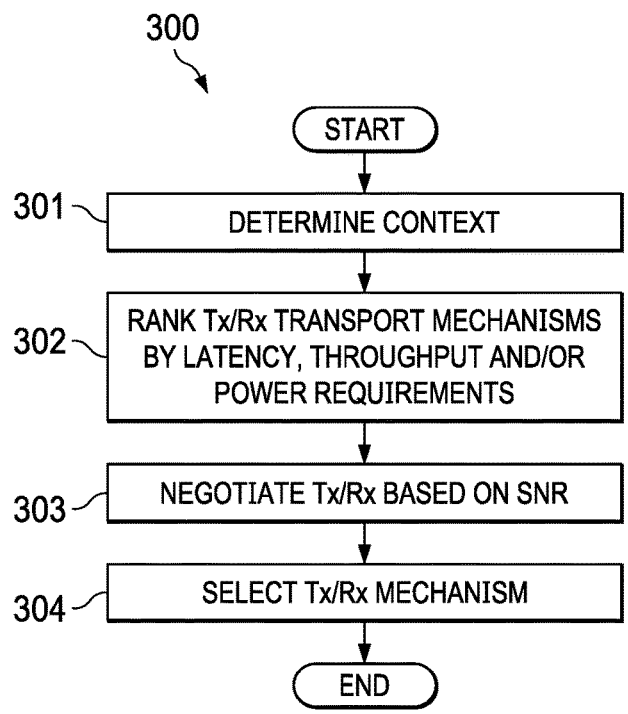
FIG. 3 is a flowchart of an example of a method for HMD-to-HMD communications, according to some embodiments.

FIG. 3 is a flowchart of an example of method 300 for HMD-to-HMD communications. In various embodiments, method 300 may be performed, at least in part, by HMD 102A executing program instructions stored in hardware memory 203, during a collaborative xR application session.

At block 301, method 300 determines a context of HMD 102A. For example, block 301 may identify different types of physical transport mechanisms (e.g., IR, ultrasound, etc.) available through the use of Tx/Rx transducers or sensors 214. Block 301 may also create an inventory of communication protocols available for each identified transport, and may determine the status of each Tx/Rx transducer or sensor 214 (e.g., enabled, operational, etc.).

At block 302, method 300 may rank the identified transport mechanisms by measured or expected latency (e.g., in ms), measured or expected throughput or bandwidth (e.g., in kbits/s), and/or measured or expected operating power requirements (e.g., in Wh, Ahr, etc.). For example, in some cases, an IR transport and/or protocol may have lower latency than an ultrasonic transport and/or protocol. Additionally, or alternatively, the IR transport and/or protocol may have a higher throughput or bandwidth than the ultrasonic transport and/or protocol. Additionally, or alternatively, the IR transport and/or protocol may have a lower operating power or battery charge requirement than the ultrasonic transport and/or protocol.

At block 303, method 300 negotiates Tx/Rx transport mechanisms and/or protocols depending upon a measured SNR of a requested transmission. In some scenarios, an HMD may have its IR sensor exposed to a noisy electromagnetic environment (e.g., direct sunlight) and therefore IR transmissions may have a low SNR (e.g., in dB). In other scenarios, an HMD may be positioned behind physical obstacles that result in acoustic transmissions with low SNR. Conditions may change, over time, as users 101A and 101B move across room 100 and gaze in different directions, thus rotating the position and field-of-view of various transceivers 214.

In some cases, the SNR of each available transport mechanism (e.g., IR, ultrasound, etc.) may be evaluated in each communication direction, and a combined SNR may be assigned to each Tx/Rx transport combination. For example, for each HMD, a combined SNR may be calculated for: (i) infrared Rx transport ($IR^{Rx}$) with infrared Tx transport ($IR^{Tx}$); (ii) infrared Rx transport ($IR^{Rx}$) with ultrasound Tx transport ($ultrasound^{Tx}$); (iii) ultrasound Rx transport ($ultrasound^{Rx}$) with infrared Tx transport ($IR^{Tx}$); and (iv) ultrasound Rx transport ($ultrasound^{Rx}$) with ultrasound Tx transport ($ultrasound^{Tx}$). It is noted, however, that these particular mechanisms are being discussed for sake of illustration only, and any other suitable transport combination may be used.

These calculations may be performed periodically, upon a change in environmental conditions, in response to a decrease or increase in available battery power below or above a threshold charge, in response to HMD movement or location, and/or in response to the HMD sensing a change in conditions for any continually discovered transport mechanism. The priority assigned to a preferred Rx mechanism in block 302 may then be negotiated in block 303 depending upon current SNR conditions for each transport with other HMDs, and method 300 may select a different hybrid Tx/Rx transport mechanism for each HMD at block 304.

For example, HMD 102A may request that HMD 102B transmit a first message to HMD 102A using the first transport, where the first transport has the lowest latency or highest throughput of all Rx transports available to HMD 102A, and it may measure a first SNR of the first message. Then, HMD 102A may request that HMD 102B transmit a second message to HMD 102A using a second transport having the second lowest latency or second highest throughput among the plurality of transports, and it may measure a second SNR of the second message. Block 304 may select the first transport to maintain the Rx channel in response to a determination that the first SNR is greater than the second SNR; or it may select the second transport in response to the second SNR being greater than the first SNR.

In some cases, in response to a battery power available to the first HMD falling below a threshold value, as determined in block 301, block 302 may determine that another transport has a lower receive or transmit power consumption than the currently used transport, and block 304 may select the other transport in response to the determination.

Figure 4:
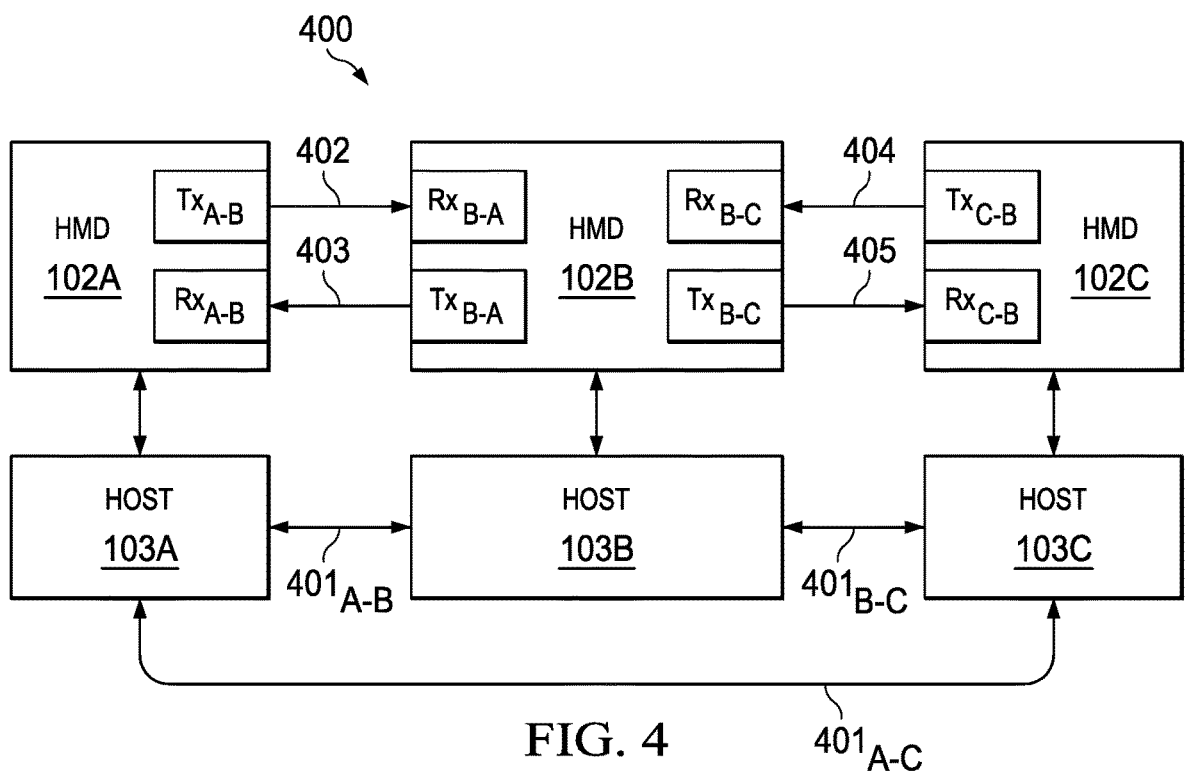
FIG. 4 is a diagram of example scenarios of HMD-to-HMD communications, according to some embodiments.

FIG. 4 is a block diagram of example scenarios of HMD-to-HMD communications, according to some embodiments. As shown, a first xR system comprises HMD 102A and host IHS 103A, a second xR system comprises HMD 102B and host IHS 102B, and a third xR system comprises HMD 102C and host IHS 103C. Host IHS 103A may communicate with host 103B via network link $401_{A-B}$, host IHS 103B may communicate with host IHS 103C via network link $401_{B-C}$, and host IHS 103A may communicate with host IHS 103C via network link $401_{A-C}$.

During operation of method 300, and independently of the presence or status of network links 401, HMD 102A uses transceiver or sensor $Tx_{A-B}$ to establish and maintain direct outbound communications channel 402 with transceiver or sensor $Rx_{B-A}$ of HMD 102B, and HMD 102 B uses transceiver or sensor $Tx_{B-A}$ to establish and maintain direct outbound communications channel 403 with transceiver or sensor $Rx_{A-B}$ of HMD 102A. Communication channels 402 and 403 may comprise a set of requests and responses that are part of a single communication session between HMDs 102A and 102B.

In some cases, a preferred physical transport mechanism (e.g., IR or ultrasound) of communication channel 402 may be selected by HMD 102B, and another preferred physical transport mechanism of communication channel 403 may be selected by HMD 102A. In various embodiments, the preferred physical transport mechanism of communication channels 402 or 403 may be switched based upon a change in conditions or SNR for a particular channel, during execution of an xR application.

Still during operation of method 300, and independently of the presence or status of network links 401, HMD 102B uses transceiver or sensor $Tx_{B-C}$ to establish and maintain direct outbound communication channel 405 with transceiver or sensor $Rx_{C-B}$ of HMD 102C, and HMD 102C uses transceiver or sensor $Tx_{C-B}$ to establish and maintain direct outbound communication channel 404 with transceiver or sensor $Rx_{B-C}$ of HMD 102B. A preferred physical transport mechanism of communication channel 405 may be selected by HMD 102C, and another preferred physical transport mechanism of communication channel 404 may be selected by HMD 102B. Again, the preferred physical transport mechanism of communications 404 or 405 may be switched based upon a change in conditions or SNR.

Coordinate Override

In an environment where multiple participants of a collaborative session are handling or viewing a shared xR model, it may be important for a given user to share his perspective of that model. For example, during a training or education session, an instructor may occasionally need to share his or her point of view of the xR model. But it would not be practical or expedient for the instructor to have all of the students move next to him or her, in order to see what he or she sees.

To address these, and other issues, using systems and methods described herein, an instructor 101A wearing HMD 103A may have his or her student 101B's HMD 102B enter a "See-What-I-See" (SWIS) mode of operation, with coordinate override turned on. In that mode, HMD 102B receives location coordinates and/or gaze vector from HMD 102A, and host IHS 103B uses that information to render video frames for display by HMD 102B, but from HMD 102A's perspective.

In some cases, this results in the video frames rendered by host IHS 103A and presented to user 101A by HMD 102A matching the video frames independently rendered by host IHS 103B and presented to user 101B by HMD 102B. HMD 102B may later toggle back to a natural xR view that matches student 101B's unique visual perspective, for example, by turning the coordinate override feature off.

In some implementations, host IHS 103B may execute a runtime engine, such as UNITY, UNREAL, AUTODESK, etc., which render an xR model displayed by HMD 102B from user 101B's unique point-of-view based upon the user's coordinate location, pose, and/or gaze relative to the model.

Conventionally, to override user 101B's view with user 101A's view, a runtime engine running on host IHS 103B would have to change the rendering of the model, based on the new coordinates received from 101B. Alternatively, a video stream would have to be provided from host IHS 103A to host IHS 103B, and then to HMD 102B. However, the inventors hereof have determined that host-to-host communications over conventional networks (e.g., via links $401_{A-B}$ and/or $401_{B-C}$) for sending and receiving data for SWIS to be unreliable, especially in co-located environments.

In contrast, the systems and methods described herein may use bi-directional, multi-modal, direct communications between HMDs 102A and 102B to transmit data required for other collaborators to enter and maintain SWIS. These solutions may use direct, low-latency communication between HMDs as a mode of transport, instead of through traditional methods which assume that all host IHSs 103A and 103B participating in the session are connected to the same network (either peer to peer or conventional WLAN or Ethernet network).

In some cases, systems and methods described herein may be triggered upon detection that a connection between host IHSs 103A and 103B would yield a lower throughput or higher latency than a direct HMD-to-HMD connection, and/or upon a determination that a throughput or latency of a host-to-host connection would be unacceptable for SWIS data (e.g., outside of selectable threshold values), particularly in a co-located environment, where the same physical space and/or user activities are shared in real time.

For instance, HMD 102A may be located at coordinates Xa, Ya, and Za, it may have a pose $Yaw_a$, $Pitch_a$, and $Roll_a$, and it may have a gaze vector Ga. HMD 102B is located at coordinates Xb, Yb, and Zb, has a pose $Yaw_b$, $Pitch_b$, and $Roll_b$, and has a gaze vector Gb. A runtime engine in host IHS 103A uses Xa, Ya, Za, $Yaw_a$, $Pitch_a$, $Roll_a$, and Ga detected by HMD 102A to render one or more video frames to be displayed by HMD 102A, and another runtime engine in host IHS 103B uses Xb, Yb, Zb, $Yaw_b$, $Pitch_b$, $Roll_b$, and Gb detected by HMD 102B to independently render video frames displayed by HMD 102B.

When HMD 102B is required to render the view of HMD 102A (e.g., user 101B wants to see what user 101A sees), however, HMD 102A communicates one or more of: Xa, Ya, Za, $Yaw_a$, $Pitch_a$, $Roll_a$, and/or Ga directly to HMD 102B. For example, HMD 102A may transmit a data payload to HMD 102B that includes authentication information and session ID, an HMD model ID, intrinsic parameters (e.g., projective mapping from world coordinates to pixel coordinates), and extrinsic parameters (e.g., parameters that define the camera center and a camera's heading in world coordinates).

The firmware of HMD 102B overrides Xb, Yb, Zb, $Yaw_b$, $Pitch_b$, $Roll_b$, and Gb and substitutes that information with Xa, Ya, Za, $Yaw_a$, $Pitch_a$, $Roll_a$, and Ga in its communication to the runtime in its own host IHS 103B. This instantly reorients the view displayed by HMD 102B to align it with the visual perspective of user 101A (as also displayed by HMD 102A).

In various embodiments, systems and methods described herein may not require changes in the runtime executed by host IHS 103B, because the runtime may continue to serve the model according to coordinates provided by the HMD 102B. Rather, these techniques may trick the runtime on host IHS 103B with a substitute coordinate system (of HMD 102A), overriding user 101B's actual coordinate system and thus altering the view location and/or pose to that of user 101A, without user 101B actually moving from his place. Additionally, Light Field Display (LFD) content may be transmitted by HMD 102A by encoding content, and HMD 102B can display the LFD content directly by decoding it.

Figure 5:
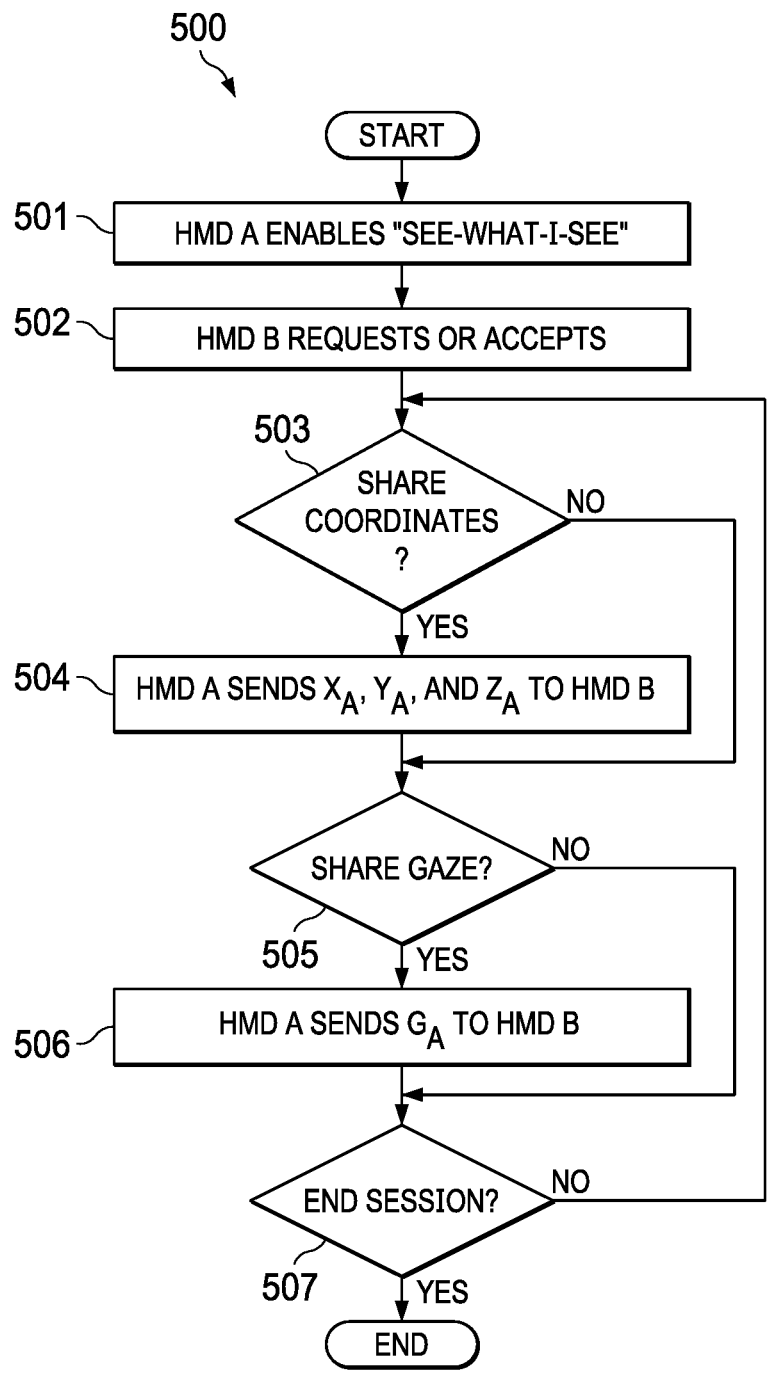
FIG. 5 is a flowchart of an example of a method for coordinate override between HMDs during a communication session, according to some embodiments.

FIG. 5 is a flowchart of an example of method 500 for coordinate override between HMDs during a communication session. In some embodiments, method 500 may be performed via direct HMD-to-HMD communications when, at block 501, HMD 102A enables SWIS mode as part of the execution of a collaborative xR application. At block 502, HMD 102B makes or accepts a SWIS request directly to or from HMD 102A.

If block 503 enables sharing of location coordinates and/or pose, at block 504 HMD 102A sends Xa, Ya, and Za, and/or yaw, pitch, and roll, information to HMD 102B using a Rx transport mechanism selected by HMD 102B. Additionally, or alternatively, if block 505 enables gaze sharing, at block 506 HMD 102A sends Ga information to HMD 102B using the same or a different Rx transport mechanism selected by HMD 102B.

In some cases, location may be shared to the exclusion of pose and/or gaze; in other cases, pose may be shared to the exclusion of location and/or gaze; and in yet other cases, gaze may be shared to the exclusion of location and/or pose.

Method 500 ends at block 507 when the collaborative xR application is finished. Until then, method 500 may be repeated, at least in part, so that HMD 102A continuously or periodically transmits Xa, Ya, Za, $Yaw_a$, $Pitch_a$, $Roll_a$, and Ga information to HMD 102B using the same or a different physical transport dynamically selected by HMD 102B, depending upon varying environmental and system conditions (e.g., low SNR due to user's movement, interference, low battery, etc.).

As such, these systems and methods may provide an override of (i) local HMD coordinate systems, and/or (ii) local HMD pose, and/or (iii) local HMD gaze, with the coordinate system, pose, or gaze information provided by another HMD, thus enabling SWIS for any runtime or application. Different sensors on an HMD maybe used to transmit the least amount of data to achieve change in model perspective. In many cases, these techniques may be applied in the absence of a shared network environment (e.g., between host IHSs) to transport the model. Moreover, these techniques do not require changes to the runtime of the rendering engine being executed by the host IHS, and do not require an application or service resident on the host IHS to transform the coordinate system with respect to other users'.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A first Head-Mounted Device (HMD), comprising:
a processor; and
a memory coupled to the processor, the memory having program instructions stored thereon that, upon execution, cause the first HMD to:
during execution of a virtual, augmented, or mixed reality (xR) application, maintain a receive (Rx) channel with a second HMD, as part of a communication session, using a first transport;
maintain a transmit (Tx) channel with the second HMD, concurrently with the Rx channel and as part of the communication session, using a second transport different from the first transport; and
wherein the first transport and the second transport are selected from a group consisting of: infrared, radio frequency, or ultrasonic.

2. The first HMD of claim 1, wherein the program instructions, upon execution, further cause the first HMD to determine a latency of each of a plurality of transports.

3. The first HMD of claim 2, wherein the program instructions, upon execution, further cause the first HMD to:
request that the second HMD transmit a first message to the first HMD using the first transport, wherein the first transport has the lowest latency among the plurality of transports, and measure a first signal-to-noise ratio (SNR) of the first message;
request that the second HMD transmit a second message to the first HMD using the second transport, wherein the second transport has the second lowest latency among the plurality of transports, and measure a second SNR of the second message; and
select the first transport to maintain the Rx channel in response to a determination that the first SNR is greater than the second SNR.

4. The first HMD of claim 1, wherein the program instructions, upon execution, further cause the first HMD to determine a throughput of each of a plurality of transports.

5. The first HMD of claim 4, wherein the program instructions, upon execution, further cause the first HMD to:
request that the second HMD transmit a first message to the first HMD using the first transport, wherein the first transport has a highest throughput among the plurality of transports, and measure a first signal-to-noise ratio (SNR) of the first message;
request that the second HMD transmit a second message to the first HMD using the second transport, wherein the second transport has a second highest throughput among the plurality of transports, and measure a second SNR of the second message; and
select the first transport to maintain the Rx channel in response to a determination that the first SNR is greater than the second SNR.

6. The first HMD of claim 1, wherein the program instructions, upon execution, further cause the first HMD to:
   transmit a first message to the second HMD using the first transport;
   transmit a second message to the second HMD using the second transport; and
   receive a selection of the second transport from the second HMD to maintain the Tx channel, at least in part, in response to a determination by the second HMD that the second SNR is greater than the first SNR.

7. The first HMD of claim 1, wherein the program instructions, upon execution, further cause the first HMD to:
   in response to a battery power available to the first HMD falling below a threshold value, determine that the first transport has a lower receive power consumption than the second transport; and
   select the first transport in response to the determination.

8. The first HMD of claim 1, wherein the program instructions, upon execution, further cause the first HMD to:
   in response to a battery power available to the second HMD falling below a threshold value, determine that the first transport has a lower transmit power consumption than the second transport; and
   select the first transport in response to the determination.

9. The first HMD of claim 1, wherein the program instructions, upon execution, further cause the first HMD to:
   in response to a degradation of the Rx channel during execution of the xR application, establish another Rx channel with the second HMD using the second transport.

10. The first HMD of claim 1, wherein the program instructions, upon execution, further cause the first HMD to:
    during execution of the xR application, maintain communications with a third HMD via the second HMD.

11. A method, comprising:
    operating, by a first Head-Mounted Device (HMD), a receive (Rx) channel with a second HMD, wherein the Rx channel uses a first transport; and
    operating, by the first HMD, a transmit (Tx) channel with the second HMD, concurrently with the Rx channel and as part of a single communications session, wherein the Tx channel uses a second transport;
    wherein the second transport is different from the first transport; and
    the first transport and the second transport are selected from a group consisting of: infrared, radio frequency, or ultrasonic.

12. The method of claim 11, further comprising determining a latency and a throughput for the Rx channel and the Tx channel.

13. The method of claim 12, further comprising:
    requesting that the second HMD transmit a first communication to the first HMD using the first transport;
    measuring a first signal-to-noise ratio (SNR) of the first communication;
    requesting that the second HMD transmit a second communication to the first HMD using the second transport;
    measuring a second SNR of the second communication; and
    switching the Rx channel to the second transport, during the single communications session, in response to a determination that the second SNR is greater than the first SNR.

14. The method of claim 12, further comprising:
    transmitting a first communication to the second HMD using the first transport;
    transmitting a second communication to the second HMD using the second transport; and
    switching the Tx channel to the first transport, during the single communications session, in response to a determination by the second HMD that an SNR of the first communication is greater than an SNR of the second communication.

15. The method of claim 12, further comprising
    in response to a battery power available to the first HMD falling below a threshold value, switching the Rx channel to the second transport.

16. The method of claim 12, further comprising:
    in response to a battery power available to the second HMD falling below a threshold value, switching the Tx channel to the first transport.

17. A hardware memory device of a first Head-Mounted Device (HMD) having program instructions stored thereon that, upon execution by a hardware processor, cause the first HMD to:
    maintain a receive (Rx) channel with a second HMD, wherein the Rx channel uses a first transport; and
    maintain a transmit (Tx) channel with the second HMD, concurrently with the Rx channel and as part of a single communications session, wherein the Tx channel uses a second transport;
    wherein the second transport is different from the first transport; and
    the first transport and the second transport are selected from a group consisting of: infrared, radio frequency, or ultrasonic.

18. The hardware memory device of claim 17, wherein the program instructions, upon execution by the hardware processor, further cause the first HMD to:
    in response to a power available to the first HMD falling below a threshold value, switch the Rx channel to the second transport.

19. The hardware memory device of claim 17, wherein the program instructions, upon execution by the hardware processor, further cause the first HMD to:
    in response to a power available to the second HMD falling below a threshold value, switch the Tx channel to the first transport.

* * * * *